US008577165B2

(12) United States Patent
Park

(10) Patent No.: US 8,577,165 B2
(45) Date of Patent: Nov. 5, 2013

(54) METHOD AND APPARATUS FOR BANDWIDTH-REDUCED IMAGE ENCODING AND DECODING

(75) Inventor: Chan-sik Park, HwaSung-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1154 days.

(21) Appl. No.: 12/494,534

(22) Filed: Jun. 30, 2009

(65) Prior Publication Data

US 2009/0324112 A1 Dec. 31, 2009

Related U.S. Application Data

(60) Provisional application No. 61/076,892, filed on Jun. 30, 2008.

(30) Foreign Application Priority Data

Oct. 14, 2008 (KR) .................. 10-2008-0100764

(51) Int. Cl.
*G06K 9/46* (2006.01)
(52) U.S. Cl.
USPC ............................................. 382/244
(58) Field of Classification Search
None
See application file for complete search history.

(56) References Cited

U.S. PATENT DOCUMENTS

| 5,777,677 A | 7/1998 | Linzer et al. |
| 6,272,180 B1 | 8/2001 | Lei |
| 7,760,804 B2 * | 7/2010 | Ruttenberg et al. ...... 375/240.12 |
| 8,225,043 B1 * | 7/2012 | Kohn et al. .................. 711/118 |
| 2006/0023789 A1 * | 2/2006 | Yamashita et al. ........ 375/240.16 |
| 2006/0050976 A1 * | 3/2006 | Molloy ............................ 382/233 |
| 2006/0072674 A1 * | 4/2006 | Saha et al. .............. 375/240.25 |
| 2008/0253673 A1 * | 10/2008 | Nakagawa ..................... 382/239 |
| 2009/0324112 A1 * | 12/2009 | Park .............................. 382/233 |

FOREIGN PATENT DOCUMENTS

WO 2004102971 A1 11/2004

OTHER PUBLICATIONS

Lee et al "A new Frame recompression algorithm integrated with H.264 video compression" Circuits and Systems, 2007. ISCAS 2007. IEEE International Symposium on.*
Bus Bandwidth Aware H.264/AVC Motion Compensation Design for High Definition Video Encoding Multimedia Signal Processing, 2007. MMSP 2007. IEEE 9th Workshop on Oct. 1-3, 2007 Chan-Sik Park Ju-Hee Kim.*

* cited by examiner

*Primary Examiner* — Sean Motsinger
(74) *Attorney, Agent, or Firm* — Sughrue Mion, PLLC

(57) ABSTRACT

An image encoding apparatus is provided, including a lossless compression unit that performs lossless compression on deblocked data on a window basis during encoding of image data; a lossless compression controller that determines a relation between the deblocked data and the losslessly compressed deblocked data and determines a size of the window; a cache controller that selects losslessly compressed deblocked data corresponding to reference data used for motion compensation or motion estimation from the losslessly compressed deblocked data, based on the relation between the deblocked data and losslessly compressed deblocked data; a lossless compression reconstruction unit that decodes the selected losslessly compressed deblocked data to reconstruct the reference data; and a cache storage unit that stores the reconstructed reference data.

32 Claims, 11 Drawing Sheets

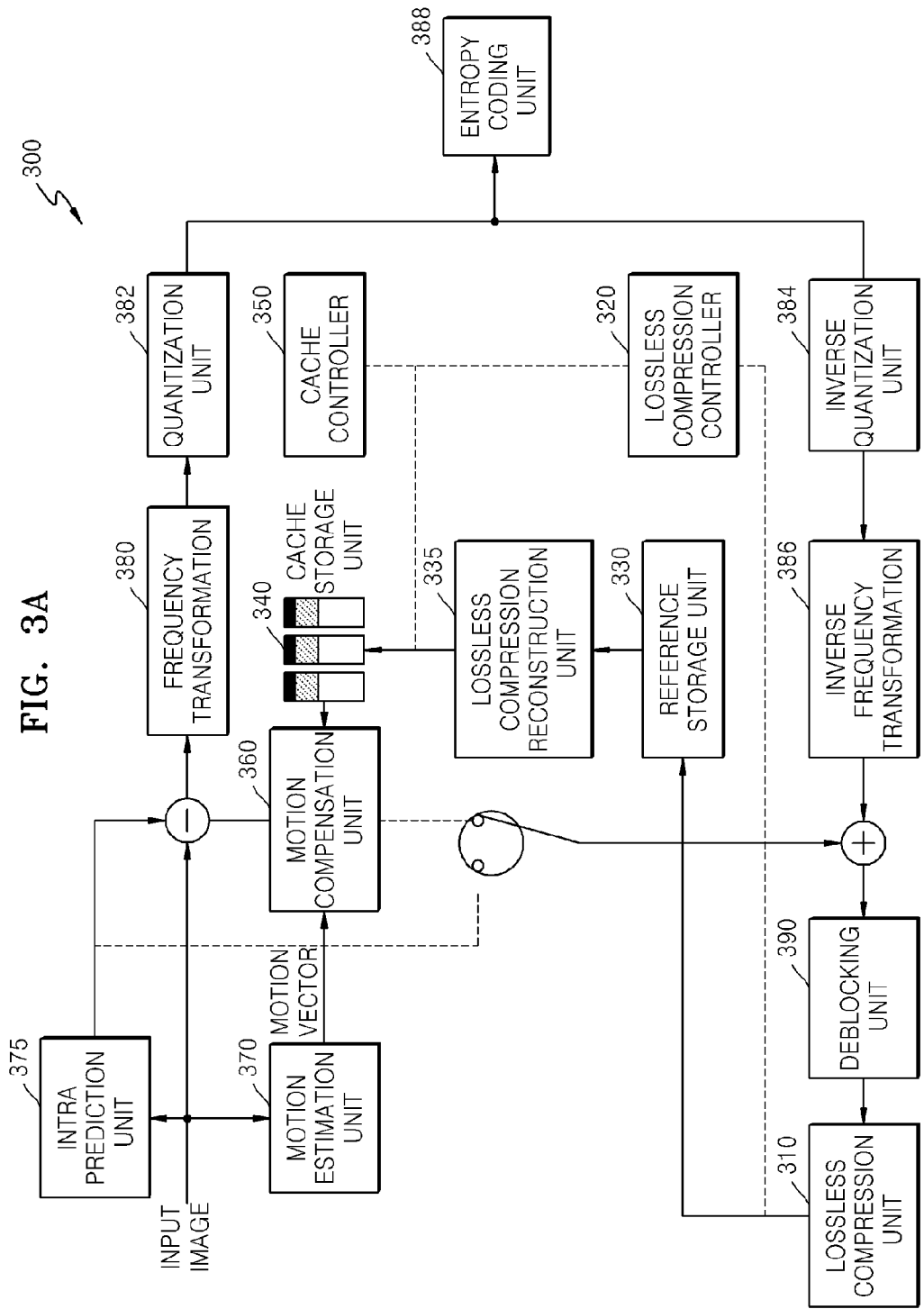

METHOD AND APPARATUS FOR BANDWIDTH-REDUCED IMAGE ENCODING AND DECODING

CROSS-REFERENCE TO RELATED PATENT APPLICATION

This application claims priority from U.S. Provisional Application No. 61/076,892, filed on Jun. 30, 2008, in the U.S. Patent and Trademark Office, and Korean Patent Application No. 10-2008-0100764, filed on Oct. 14, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to image encoding and decoding and more particularly, to an image encoding apparatus and method and an image decoding apparatus and method for reducing the occupancy rate of bandwidth of a data bus during an image encoding/decoding process.

2. Description of the Related Art

In an image encoding/decoding system, as the size of an image increases, more frames are required to be processed per second, and bandwidth shortage and real-time processing issues become more serious. In particular, in image encoding/decoding systems, much of the available bandwidth is used to perform motion estimation, motion compensation and deblocking filtering and thus various attempts have been made to reduce the size of data therefor.

In image encoding/decoding systems, residual information is generated from a comparison of a current frame with a reference frame. Thus the reference frame and the residual information between the current frame and the reference frame are needed to reconstruct the current frame. Reference data is transmitted from an external memory via a data bus.

SUMMARY OF THE INVENTION

The present invention provides an image encoding apparatus and method and an image decoding apparatus and method for reducing the occupancy rate of bandwidth of a data bus during an image encoding/decoding process.

According to an aspect of the present invention, there is provided an image encoding apparatus including a lossless compression unit performing lossless compression on deblocked data on a window basis during encoding of image data; a lossless compression controller determining a relation between the deblocked data and losslessly compressed deblocked data and a size of the window; a cache controller selecting losslessly compressed deblocked data corresponding to reference data used for motion compensation or motion estimation from the losslessly compressed deblocked data, based on the relation between the deblocked data and losslessly compressed deblocked data; a lossless compression reconstruction unit decoding the selected losslessly compressed deblocked data to reconstruct the reference data; and a cache storage unit storing the reconstructed reference data.

According to another aspect of the present invention, there is provided an image decoding apparatus including a lossless compression unit performing lossless compression on deblocked data on a window basis during decoding of encoded image data; a lossless compression controller determining a relation between the deblocked data and losslessly compressed deblocked data and a size of the window; a cache controller selecting losslessly compressed deblocked data corresponding to reference data used for motion compensation or motion estimation from the losslessly compressed deblocked data, based on the relation between the deblocked data and losslessly compressed deblocked data; a lossless compression reconstruction unit decoding the selected losslessly compressed deblocked data to reconstruct the reference data; and a cache storage unit storing the reconstructed reference data.

The image encoding/decoding apparatus my further include a reference storage unit storing the losslessly compressed deblocked data, wherein the losslessly compressed deblocked data is input to the reference storage unit or is output from the reference storage unit via a data bus.

The cache controller may determine reference data that is to be reconstructed and stored in the reference storage unit in consideration of an available bandwidth and burst characteristics of the data bus.

The lossless compression controller may determine the size of the window in consideration of an available bandwidth and burst characteristics of the data bus.

The cache controller may determine a cycle and location in which the reconstructed reference data is stored in the cache storage unit, in consideration of an available bandwidth and burst characteristics of the data bus.

The image decoding apparatus may further include a motion compensation unit performing motion compensation by using the reconstructed reference data; and a motion estimation unit performing motion estimation by using the reconstructed reference data.

The lossless compression controller may store compression information regarding a starting index and a length of each of sections of the losslessly compressed deblocked data, based on the relation between the deblocked data and losslessly compressed deblocked data.

The cache storage unit may include a first part in which data falls within a vertical search range for searching for reference data; and a second part which is the remaining part of the cache storage unit excluding the first part.

The cache controller may control reference data in a current cycle to be stored in the first part of the cache storage unit, and control reference data in a next cycle to be periodically updated in the second part of the cache storage unit in consideration of bandwidth and burst characteristics of the data bus.

When the image decoding apparatus has a pipelined structure in which each of motion estimation, motion compensation, frequency transformation and quantization, and deblocking is sequentially performed on one block in one operating cycle during decoding of the image data, the lossless compression unit may perform lossless compression in an operating cycle corresponding to the window whose size is determined based on the bandwidth and burst cycle of the data bus.

The image decoding apparatus may further include an entropy decoding unit performing entropy decoding on the encoded image data, an inverse quantization unit inversely quantizing the entropy-decoded data, an inverse frequency transformation unit performing inverse frequency transformation on the inversely quantized data, and a deblocking filter performing deblocking filtering on the inversely frequency-transformed data.

According to another aspect of the present invention, there is provided an image encoding method including performing lossless compression on deblocked data on a window basis during encoding of image data; determining a relation between the deblocked data and losslessly compressed deblocked data and a size of the window; selecting losslessly compressed deblocked data corresponding to reference data used to perform motion compensation or motion estimation from the losslessly compressed deblocked data, based on the relation between the deblocked data and losslessly compressed deblocked data; decoding the selected losslessly compressed deblocked data to reconstruct the reference data; and storing the reconstructed reference data in a cache buffer.

According to another aspect of the present invention, there is provided an image decoding method including performing lossless compression on deblocked data on a window basis during decoding of encoded image data; determining a relation between the deblocked data and losslessly compressed deblocked data and a size of the window; selecting losslessly compressed deblocked data corresponding to reference data used to perform motion compensation or motion estimation from the losslessly compressed deblocked data, based on the relation between the deblocked data and losslessly compressed deblocked data; decoding the selected losslessly compressed deblocked data to reconstruct the reference data; and storing the reconstructed reference data in a cache buffer.

The losslessly compressed deblocked data may be input to or output from a reference memory via a data bus.

The image encoding/decoding method may further include determining reference data that is to be reconstructed and stored in the reference memory in consideration of an available bandwidth and burst characteristics of the data bus.

The image encoding/decoding method may further include determining the size of the window in consideration of an available bandwidth and burst characteristics of the data bus. The performing of lossless compression may include performing lossless compression on the deblocked data in the window whose size is determined.

A cycle and location in which the reconstructed reference data is stored in the cache buffer may be determined in consideration of an available bandwidth and burst characteristics of the data bus.

The image encoding/decoding method may further include performing motion compensation by using the reconstructed reference data; and performing intra prediction by using the reconstructed reference data.

The determining of the relation between the deblocked data and losslessly compressed deblocked data may include determining compression information regarding a starting index and a length of each of sections of the losslessly compressed deblocked data, based on the relation between the deblocked data and losslessly compressed deblocked data.

The cache buffer may include a first part in which data falls within a vertical search range for searching for reference data; and a second part which is the remaining part of the cache storage unit excluding the first part.

The storing of the reconstructed reference data in the cache buffer may include storing reference data in a current cycle in the first part of the cache storage unit; and periodically updating and storing reference data in a next cycle in the second part of the cache storage unit in consideration of bandwidth and burst characteristics of the data bus.

If the image encoding/decoding method uses a pipelined structure in which each of motion estimation, motion compensation, frequency transformation and quantization, and deblocking is sequentially performed on one block in one operating cycle during decoding of the image data, then lossless compression may be performed in an operating cycle corresponding to the window whose size is determined based on the bandwidth and burst cycle of the data bus.

The image encoding/decoding method may further include entropy decoding the encoded image data, inversely quantizing the entropy-encoded data, performing inverse frequency transformation on the inversely quantized data, and performing deblocking filtering on the inversely frequency-transformed data.

According to another aspect of the present invention, there is provided a computer readable recording medium having recorded thereon a computer program for executing the image encoding method.

According to another aspect of the present invention, there is provided a computer readable recording medium having recorded thereon a computer program for executing the image decoding method.

BRIEF DESCRIPTION OF THE DRAWINGS

The above and other features and advantages of the present invention will become more apparent by describing in detail exemplary embodiments thereof with reference to the attached drawings in which:

FIG. 3A is a block diagram of an image encoding apparatus according to an exemplary embodiment of the present invention;

DETAILED DESCRIPTION OF EXEMPLARY EMBODIMENTS OF THE INVENTION

Hereinafter, exemplary embodiments of an image encoding apparatus and method and an image decoding apparatus and method according to the present invention will be described in detail with reference to FIGS. 1 through 10. The present invention provides variable window-based lossless compression and a method of reducing the occupancy rate of bandwidth of a data bus using a cache system in an image encoding/decoding system according to an embodiment of the present invention.

Figure 1:
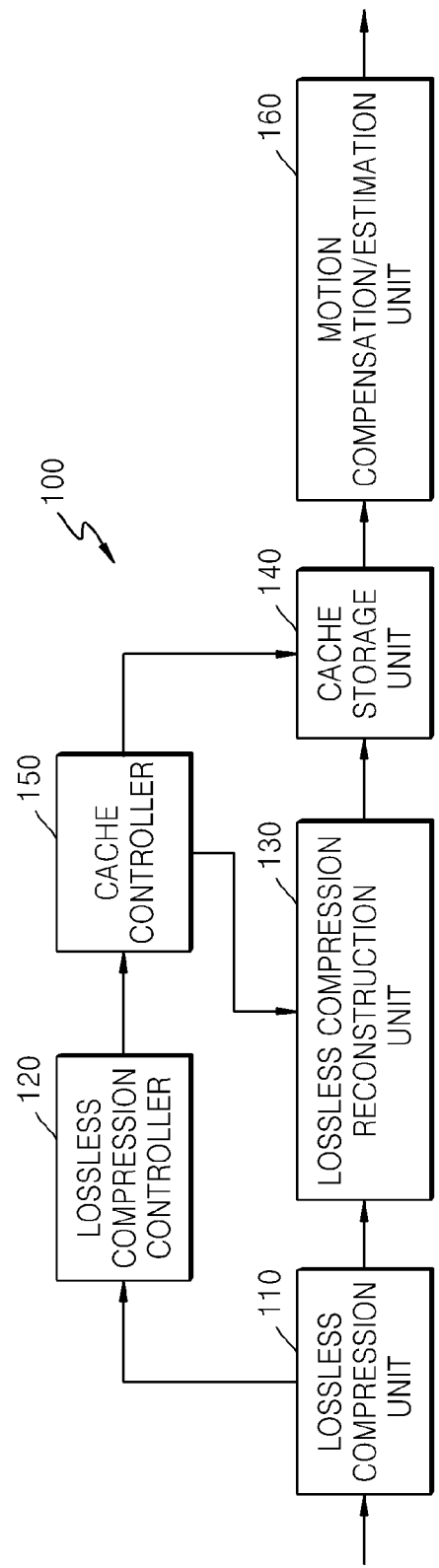
FIG. 1 is a block diagram of a cache reference providing apparatus for encoding or decoding an image according to an exemplary embodiment of the present invention.

FIG. 1 is a block diagram of a cache reference providing apparatus 100 for encoding or decoding an image according to an exemplary embodiment of the present invention. The cache reference providing apparatus 100 includes a lossless compression unit 110, a lossless compression controller 120, a lossless compression reconstruction unit 130, a cache storage unit 140, a cache controller 150, and a motion compensation/estimation unit 160. The cache reference providing apparatus 100 may further include a reference storage unit (not shown) that stores losslessly compressed deblocked data.

Data that is input to or output from the reference storage unit is transmitted via a data bus having a predetermined bandwidth. In an exemplary embodiment of the present invention, the lossless compression unit 110 receives spatial data and performs lossless compression thereon. In an image encoding/decoding system, the spatial data may be de-blocked data. The deblocked data is losslessly compressed on a predetermined-sized window basis. The deblocked data may be used as reference data for motion estimation and compensation of other data.

In an exemplary embodiment of the present invention, the lossless compression controller 120 determines the size of a lossless compression window by determining the relation between data, which is deblocked through motion compensation and according to a cache algorithm, and losslessly compressed deblocked data, and provides the cache controller 150 with information necessary to search for reference data. The lossless compression controller 120 may store compression information regarding data that is losslessly compressed according to the relation between the deblocked data and the losslessly compressed deblocked data. The compression information may specify a starting index and length of each of sections of the losslessly compressed deblocked data. The total number of sections of the losslessly compressed deblocked data is proportional to the sizes and total number of windows for lossless compression.

The lossless compression controller 120 may determine a data region of the deblocked data, which is to be losslessly compressed, based on an available bandwidth and burst characteristics of the data bus. Also, the lossless compression controller 120 may determine the data region that is to be losslessly compressed, considering whether deblocking filtering is completed. Thus the data region that is to be losslessly compressed may be determined to vary. The compression information of each of the sections of the losslessly compressed deblocked data may vary depending on the determined data region.

In an exemplary embodiment of the present invention, the lossless compression reconstruction unit 130 reconstructs reference data by decoding losslessly compressed deblocked data corresponding to reference data selected by the cache controller 150 from among data that is losslessly compressed by the compression unit 110. The reconstructed reference data is output to the cache storage unit 140.

In an exemplary embodiment of the present invention, the cache storage unit 140 stores the reference data reconstructed under control of the cache controller 150. The cache storage unit 140 is divided into a first part and a second part. The height of the first part of the cache storage unit 140 falls within a vertical search range for searching for the reference data and the second part thereof is the remaining part of the cache storage unit 140 excluding the first part. The cache storage unit 140 may be a type of cache.

In an exemplary embodiment of the present invention, the first part of the cache storage unit 140 may be a space for storing reference data used to perform motion compensation and estimation in a current cycle, and the second part thereof may be space for storing reference data used to perform motion compensation and estimation in a next cycle.

In an exemplary embodiment of the present invention, the cache controller 150 determines losslessly compressed deblocked data that is to be reconstructed by the lossless compression reconstruction unit 130. The cache controller 150 also determines a cycle in which the reference data reconstructed by the lossless compression reconstruction unit 130 is stored in the cache storage unit 140, the amount of the reference data stored, and a location in the cache storage unit 140 in which the reference data is to be stored. The cache controller 150 considers both or either one of an available bandwidth and burst characteristics of the data bus to determine the cycle in which the reference data is stored and the location in the cache storage unit 140 in which the reference data is stored.

Information regarding data bus bandwidth available for motion compensation may be obtained from system software. Also, the cache controller 150 may control four or more bursts of data to be stored so that one line of the second part of the cache storage unit 140 may be accessed per clock cycle, considering the burst characteristics of the data bus and efficient bank interleaving.

The cache controller 150 may select reference data by searching for it based on picture order count (POC) information and parity information of the reference data. During motion estimation, reference data may be selected using an estimation algorithm.

The cache controller 150 needs information regarding the relation between the deblocked data and the losslessly compressed deblocked data to search the losslessly compressed deblocked data for data that is to be reconstructed as reference data. Thus, the cache controller 150 may use the compression information regarding the starting index and length of each of the sections of the losslessly compressed deblocked data, which is received from the lossless compression controller 120.

The cache controller 150 may detect the losslessly compressed deblocked data corresponding to the reference data based on the compression information of the losslessly compressed deblocked data, and control the losslessly compressed deblocked data to be reconstructed by the lossless compression reconstruction unit 130.

For processing data on a block-by-block basis, the cache controller 150 may determine the number and range of blocks corresponding to the reference data stored in the cache storage unit 140. The cache controller 150 may detect losslessly compressed deblocked data corresponding to the number and range of reference data blocks, and control the lossless compression reconstruction unit 130 to reconstruct the losslessly compressed deblocked data.

The motion compensation/estimation unit 160 performs motion compensation or motion estimation by using the reference data received via the cache storage unit 140.

In an exemplary embodiment of the present invention, in order to provide reference data by using the cache storage unit 140, the cache controller 150, the lossless compression controller 120 and the lossless compression reconstruction unit 130 operate together to select losslessly compressed deblocked data, decode the losslessly compressed deblocked data and then reconstruct the reference data.

For example, in an exemplary embodiment of the present invention, the cache controller 150, the lossless compression controller 120 and the lossless compression reconstruction unit 130 operate together, as follows:

(i) the cache controller 150 determines reference data that is to be stored in the cache storage unit 140 in a predetermined cycle, based on bus bandwidth and burst characteristics;

(ii) the cache controller 150 receives compression information regarding losslessly compressed deblocked data from the lossless compression controller 120, and detects data corresponding to reference data that is to be reconstructed from among lossless compressed deblocked data stored in the reference storage unit;

(iii) the cache controller 150 controls the detected losslessly compressed deblocked data to be decoded by the lossless compression reconstruction unit 130; and (iv) the reference data is reconstructed by decoding the losslessly compressed deblocked data by the lossless compression reconstruction unit 130 and then is stored in an appropriate location in the cache storage unit 140.

According to an exemplary embodiment of the present invention, the cache controller 150 controls both reference data that is currently needed and reference data that needs to be stored in the cache storage unit 140 next. Since the reference data is continuously stored, the reference data is synchronized with a storing cycle of the cache storage unit 140 and the stored reference data is synchronized with a cycle of performing motion compensation/estimation while increasing the speed of access of the motion compensation/estimation unit 160 to the reference data.

For example, the cache controller 150 may control current reference data to be stored in the first part of the cache storage unit 140 and next reference data to be stored in the second part of the cache storage unit 140. At the same time, the cache controller 150 may determine a cycle in which the reference data is stored in the cache storage unit 140 and the amount of the reference data stored, in consideration of data bus bandwidth and burst characteristics.

To minimize repetitive access to data in a motion estimation system and a motion compensation system, reference data is losslessly compressed and then transmitted via a cache and in burst units determined in consideration of the efficiency of row address strobe (RAS) interleaving, column address strobe (CAS) interleaving, and bank interleaving. In this case, the reference data is reconstructed from data that is deblocked and then losslessly compressed.

Since the data is deblocked, losslessly compressed and then transmitted via a data bus, the occupancy rate of bandwidth of the data bus for transmitting deblocked reference data is reduced. The motion estimation system and the motion compensation system use a cache reference that is reconstructed from the losslessly compressed deblocked data and stored in the cache, and the occupancy rate of bandwidth of the data bus for transmitting reference data may also be reduced. Also, the reference data is read from the cache, thereby reducing the amount of processing time.

Figure 2:
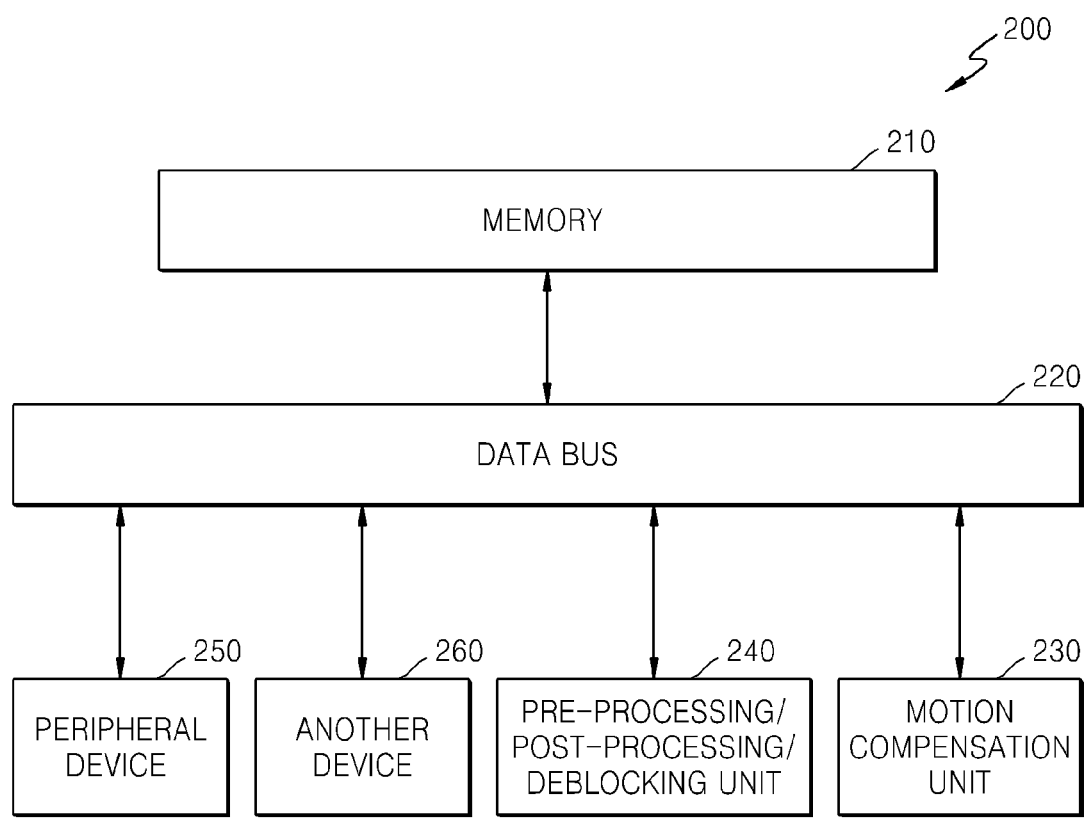
FIG. 2 is a block diagram illustrating a data transmission environment between constitutional elements of an image encoding/decoding system and a data bus according to an exemplary embodiment of the present invention.

FIG. 2 is a block diagram illustrating a data transmission environment 200 between constitutional elements of an image encoding/decoding system and a data bus according to an exemplary embodiment of the present invention. The image encoding/decoding system includes a memory 210, and a data bus 220 via which data is exchanged between the memory 210 and each of a motion compensation unit 230, a pre-processing/post-processing/deblocking unit 240, a peripheral device 250 and another device 260.

However, for data transmission via the data bus 220 which is a 32-bit data bus, the pre-processing/post-processing/deblocking unit 240 may occupy a data bus bandwidth of 94 MHz, an Advanced RISC (Reduced Instruction Set Computing) Machine (ARM) core and the peripheral device 250 may occupy a data bus bandwidth of 100 MHz, the other device 260 may occupy a data bus bandwidth of 20 MHz, and the motion compensation unit 230 may occupy a data bus bandwidth of up to 560 MHz. Similarly, for data transmission via the data bus 220 which is a 64-bit data bus, the motion compensation unit 230, the pre-processing/post-processing/deblocking unit 240, the ARM core and the peripheral device 250 and the other device 260 may respectively occupy a data bus bandwidth of 280 MHz, 47 MHz, 10 MHz, and 60 MHz.

Accordingly, since the motion compensation unit 230 occupies a relatively wide data bus bandwidth, a collision may occur between the motion compensation unit 230 and the other devices 240 through 260 or inefficient transmission of data may occur.

FIG. 3A is a block diagram of an image encoding apparatus 300 according to an exemplary embodiment of the present invention. The image encoding apparatus 300 includes a lossless compression unit 310, a lossless compression controller 320, a reference storage unit 330, a lossless compression reconstruction unit 335, a cache storage unit 340, a cache controller 350, a motion compensation unit 360, a motion estimation unit 370, an intra prediction unit 375, a frequency transformation unit 380, a quantization unit 382, an inverse quantization unit 384, an inverse frequency transformation unit 386, an entropy coding unit 388, and a deblocking unit 390.

For example, if the image encoding apparatus 300 operates according to the H.264/AVC (Advanced Video Coding) standard, the motion compensation unit 360 performs motion compensation using a motion vector received from the motion estimation unit 370 and reference data received from the cache storage unit 340. When data that is motion-compensated by the motion compensation unit 360 and data that is intra-predicted by the intra prediction unit 375 is sequentially transmitted to the frequency transformation unit 380, the quantization unit 382 and the entropy coding unit 388, data encoded according to the H.264/AVC standard may be obtained.

If the motion-compensated data and the intra-predicted data are sequentially transmitted to the frequency transformation unit 380, the quantization unit 382, the inverse quantization unit 384, the inverse frequency transformation unit 386, and the deblocking unit 390, then the resultant data may be used as reference data to perform motion estimation and compensation in a next cycle.

In an exemplary embodiment of the present invention, the image encoding apparatus 300 may further include a motion estimation information input unit (not shown) that obtains a reference index and the range of estimation to perform motion estimation and compensation by using reference data selected in a current cycle according to a motion estimation algorithm, and a reference storing checking unit (not shown) that checks whether reference data corresponding to the reference index is stored in the cache storage unit 340. In an exemplary embodiment of the present invention, the motion compensation unit 360 may perform motion compensation in a current cycle by using the reference data and a motion vector.

In an exemplary embodiment of the present invention, the lossless compression unit 310, the lossless compression controller 320, the reference storage unit 330, the lossless compression reconstruction unit 335, the cache storage unit 340, and the cache controller 350 of the image encoding apparatus 300 may respectively correspond to the lossless compression unit 110, the lossless compression controller 120, the reference storage unit (not shown), the lossless compression reconstruction unit 130, the cache storage unit 140, and the cache controller 150 of the reference providing apparatus 100 according to the embodiment of FIG. 1.

Thus the lossless compression unit 310 receives deblocked data from the deblocking unit 390 and performs lossless compression thereon. The reference storage unit 330 stores the deblocked data that is losslessly compressed by the lossless compression unit 310. The lossless compression controller 320 determines the size of a window that is to be compressed when the deblocked data is losslessly compressed, controls lossless compression to be performed according to a pipelined method, and controls the lossless compression reconstruction unit 335 to decode the losslessly compressed deblocked data stored in the reference storage unit 330.

Reference data is transmitted from the lossless compression unit 310 to the reference storage unit 330 or from the reference storage unit 330 to the lossless compression reconstruction unit 335 via a data bus (not shown). In this case, losslessly compressed deblocked data is transmitted as the reference data, thereby reducing the occupancy rate of bandwidth of the data bus for transmitting the deblocked data. The cache controller 350, the reference storage unit 330, the lossless compression reconstruction unit 335, and the lossless compression controller 320 may exchange information with one another to determine reference data and the speed at which the reference data will be stored in the cache storage unit 340 in consideration of the data bus and burst efficiency.

Also, the cache controller 350 determines the storing speed and locations of reference data for performing motion compensation and estimation in a current cycle and reference data for performing motion compensation and estimation in a next cycle, which are stored in the cache storage unit 340, to be synchronized with cycles of motion compensation and estimation. Thus the motion compensation unit 360 and the motion estimation unit 370 may efficiently receive the reference data via the cache storage unit 340.

All reference data may be stored in the cache storage unit 312 but only specific reference data selected according to a cache algorithm may be stored therein. If reference data obtained according to the cache algorithm via the cache controller 311 does not correspond to a decoded reference index, the lossless compression controller 308 may read other reference data from a memory other than the cache storage unit 312, via the data bus.

If the data processing efficiency of the motion compensation unit 360 or the motion estimation unit 370, the operations of which occupy a large amount of the bandwidth of the data bus, is improved, the encoding efficiency of the image encoding apparatus 300 may also be improved.

Figure 3B:
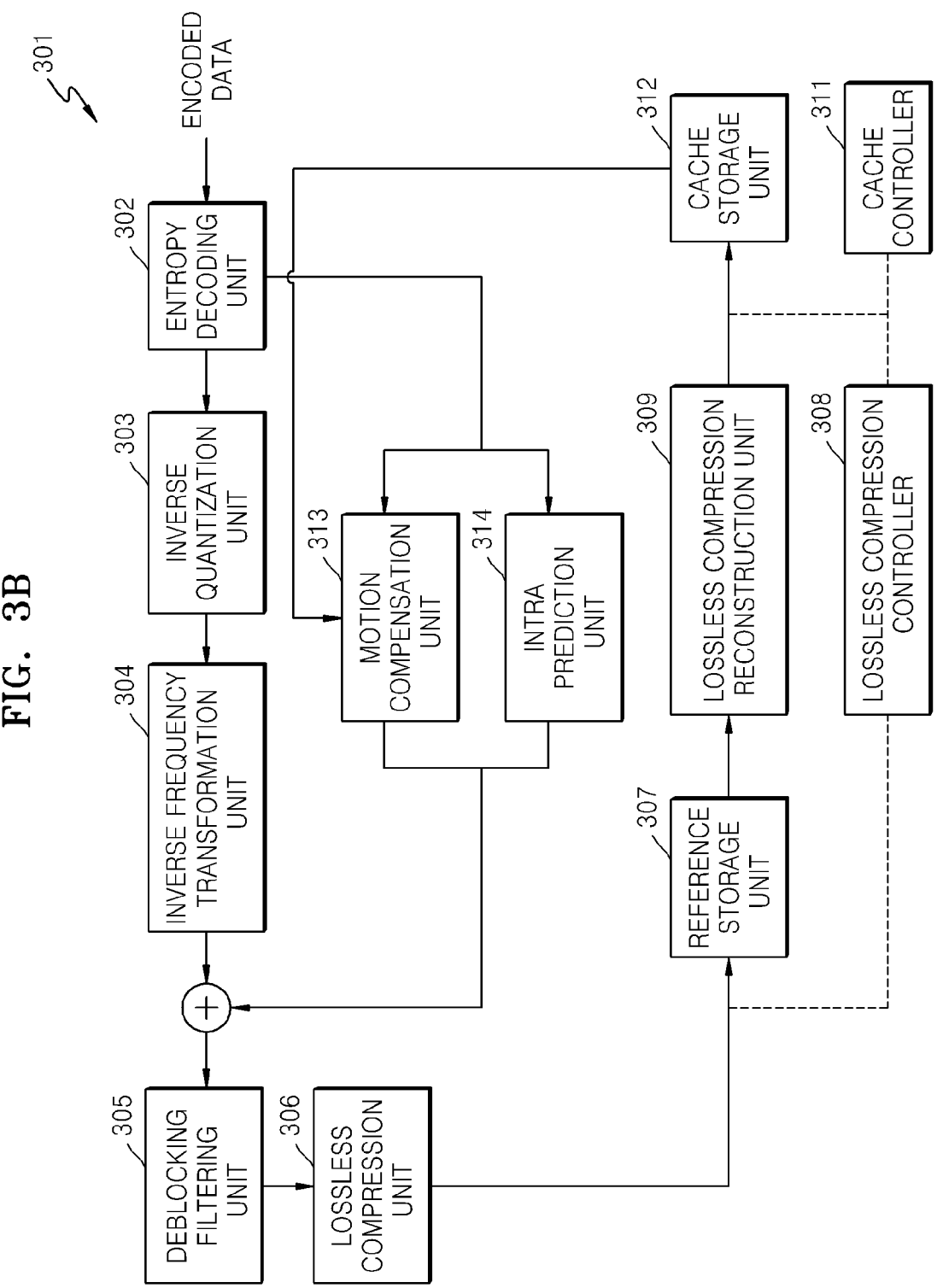
FIG. 3B is a block diagram of an image decoding apparatus according to an exemplary embodiment of the present invention.
Figure 4:
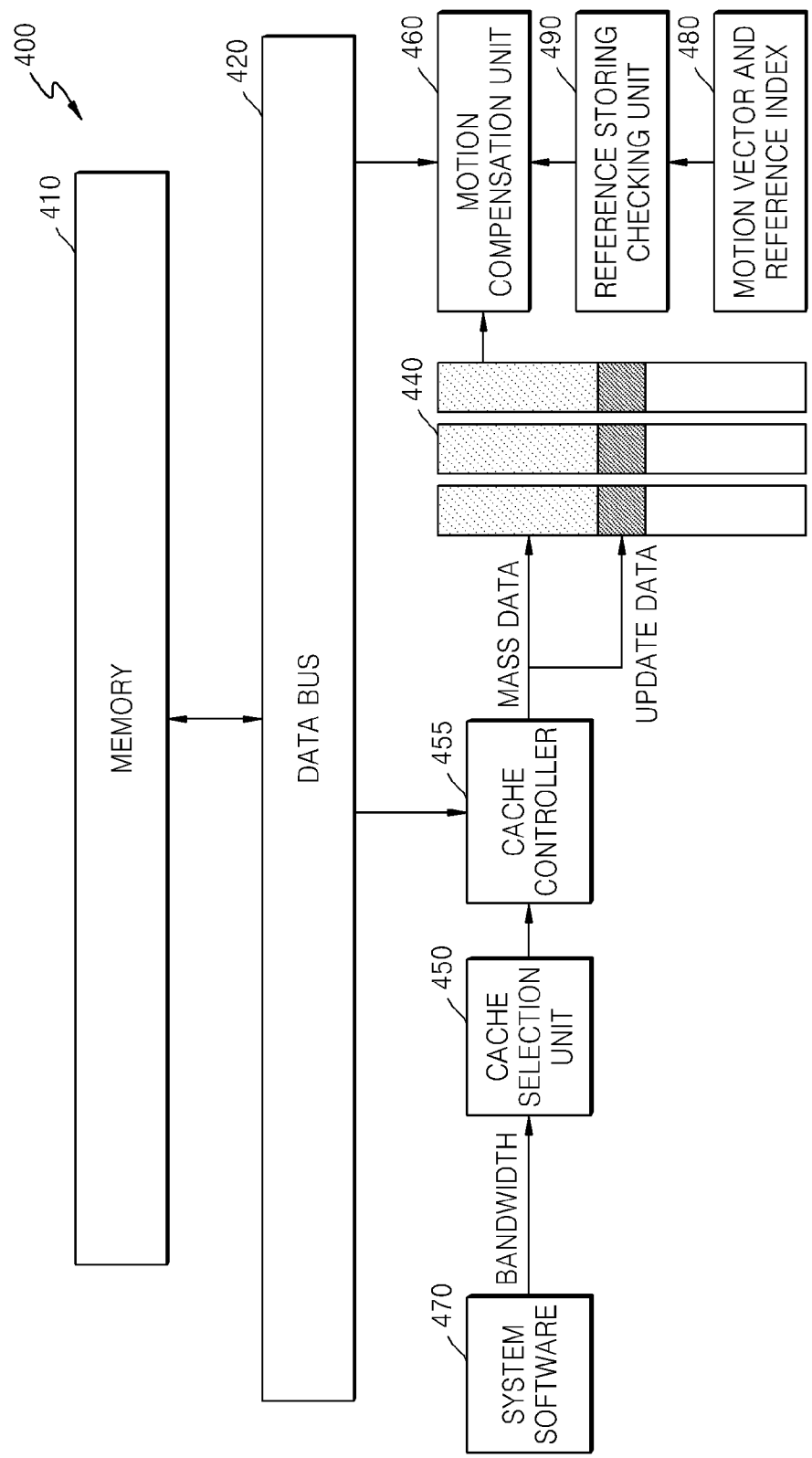
FIG. 4 is a block diagram illustrating a process of transmitting reference data via a data bus according to an exemplary embodiment of the present invention.

The cache reference providing apparatus 100 according to an exemplary embodiment of the present invention may be mounted in not only the image encoding apparatus 300 of FIG. 3 but also an image decoding apparatus 301 illustrated in FIG. 4.

FIG. 3B is a block diagram of the image decoding apparatus 301 according to an exemplary embodiment of the present invention. The image decoding apparatus 301 includes an entropy decoding unit 302, an inverse quantization unit 303, an inverse frequency transformation unit 304, a deblocking filtering unit 305, a lossless compression unit 306, a reference storage unit 307, a lossless compression controller 308, a lossless compression reconstruction unit 309, a cache controller 311, a cache storage unit 312, a motion compensation unit 313, and an intra prediction unit 314.

The image decoding apparatus 301 receives encoded data and decodes it to reconstruct an image. For example, if the image decoding apparatus 301 operates according to the H.264/AVC standard, image data may be reconstructed by decoding the encoded data on which entropy cryptography was performed by the entropy decoding unit 302, sequentially transmitting the decoding result to the inverse quantization unit 303 and the inverse frequency transformation unit 304 to reconstruct image data in a spatial domain, and then reducing the blocking effect on the resultant image data by the deblocking filtering unit 305. The motion compensation unit 313 performs motion compensation using a reference index and a motion vector received from the entropy decoding unit 302.

The lossless compression unit 306, the reference storage unit 307, the lossless compression controller 308, the lossless compression reconstruction unit 309, the cache controller 311, and the cache storage unit 312 of the image decoding apparatus 301 respectively correspond to and have the same function as the lossless compression unit 310, the reference storage unit 330, the lossless compression controller 320, the lossless compression reconstruction unit 335, the cache controller 350, and the cache storage unit 340 of the image encoding apparatus 300.

Thus since data that is deblocked and losslessly compressed is transmitted via a data bus, a bandwidth necessary for transmitting reference data may be reduced. Also, since cache reference data, which has been losslessly compressed, transmitted via the data bus and then reconstructed, is used for motion estimation and compensation, an occupancy rate of the bandwidth may be reduced. Also, reference data is obtained from a cache memory, and thus the amount of processing time may be reduced. Accordingly, the overall decoding efficiency of the image decoding apparatus 301 may be improved.

It is possible to detect and decode desired losslessly compressed deblocked data, store the decoding result in a cache, and use it as reference data, by using compression information regarding an index and length of each of sections of losslessly compressed deblocked data, which is obtained from the lossless compression controller 308. Thus, it is possible to solve a problem that an index of reference data is changed when the reference data is losslessly compressed and thus desired data cannot be searched for using the original index of the reference data.

Also, lossless compression is performed according to a variable-sized lossless compression window determined by the lossless compression controller 308, and thus, a space for storing the compression information may be reduced.

FIG. 4 is a block diagram of a method of transmitting reference data via a data bus according to an exemplary embodiment of the present invention. A data transmission system 400 may improve data transmission efficiency by determining a speed at which or a cycle in which data that is to be used for motion compensation is transmitted via a data bus 420, or by determining the amount of data transmitted, in consideration of the bandwidth of the data bus 420.

More specifically, system software 470 provides a cache selection unit 450 with information regarding a bandwidth available to the data transmission system 400 from among the bandwidth of the data bus 420.

The cache selection unit 450 determines the size of units in which data is to be periodically stored in the cache storage unit 440, based on the available bandwidth. For example, the units in which reference data is stored may be predetermined sized reference blocks or a predetermined number of reference blocks. A cache controller 455 may select data corresponding to the units in which the reference data is stored from among data stored in an external memory 410.

The cache storage unit 440 stores reference data for performing motion estimation and compensation in a current cycle as mass data, and stores reference data for performing motion estimation and compensation in a next cycle as update data. In an exemplary embodiment of the present invention, the cache controller 455 may control the cache storage unit 440 to update stored reference data as update data in a previous cycle, into mass data to be used to perform motion estimation and compensation in a current cycle. Thus the amount of reference data used for motion estimation and compensation in the current cycle, has been stored as update data in the cache storage unit 440 before the current cycle. Also, in an exemplary embodiment of the present invention, the cache controller 455 may control data, which is selected for a next cycle, to be updated as update data in the cache 440 storage unit.

A motion vector and reference index 480 is necessary to operate a motion compensation unit 460. A reference storing checking unit 490 may check whether reference data corresponding to the motion vector and reference index 480 is stored in the cache storage unit 440, and may determine a location where the corresponding reference data is stored, and provide the checking results to the motion compensation unit 460. The motion compensation unit 460 may use reference data received from both or one of the external memory 410 and the cache storage unit 440 based on the motion vector and reference index 480.

Accordingly, the cache controller 455 may periodically transmit reference data from the external memory 410 or a reference storage unit (not shown) to the cache storage unit 440, based on a storing cycle determined in consideration of an available bandwidth and the amount of data that is to be stored.

Referring to FIG. 4, even if motion compensation is performed in consideration of the bandwidth of the data bus 420, transmission of reference data from the external memory 410 uses a large part of the bandwidth of the data bus 420. Thus a method of storing losslessly compressed deblocked data in the cache storage unit 440 via the data bus 420 will now be described with reference to FIG. 5.

Figure 5:
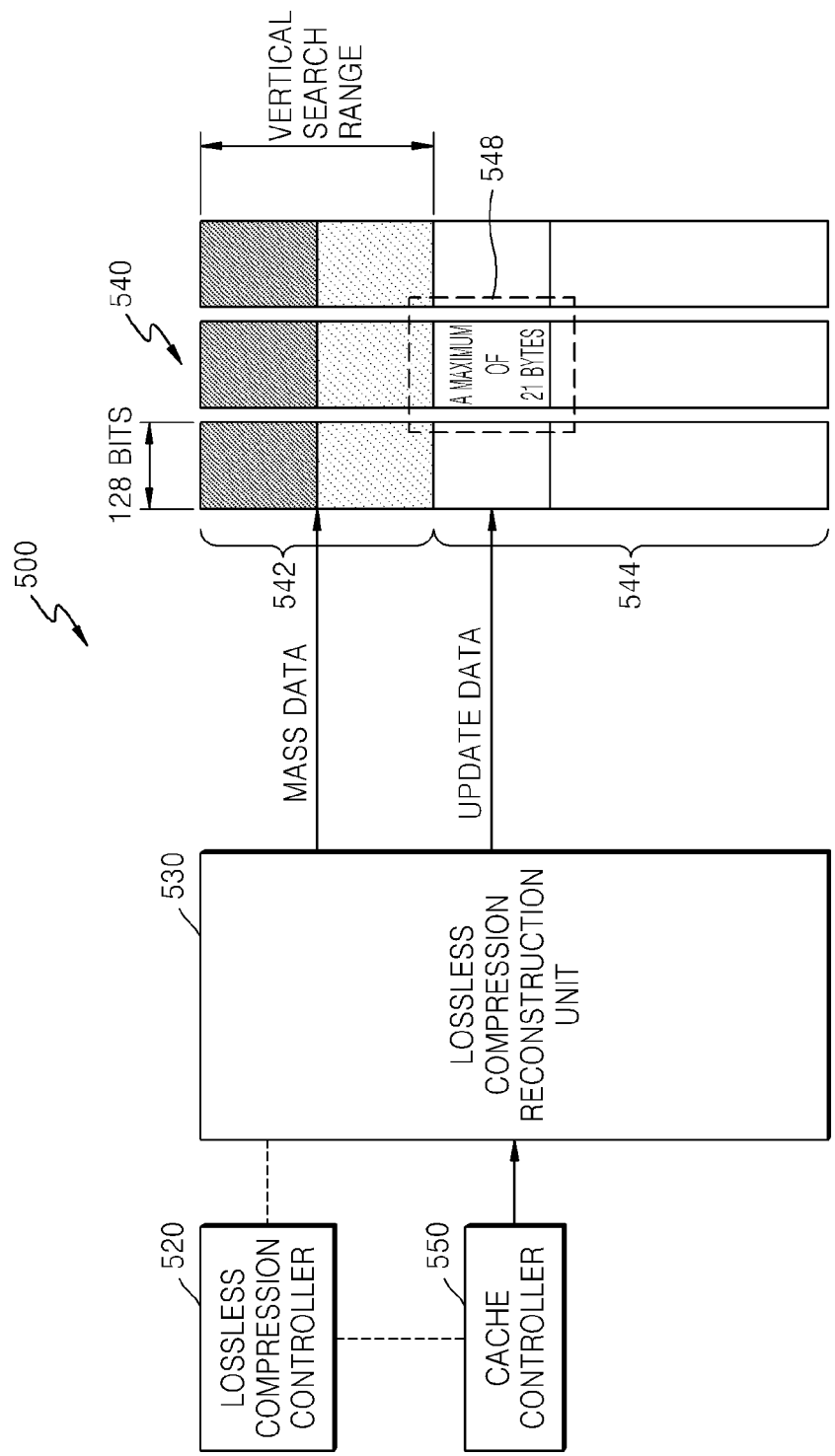
FIG. 5 is a block diagram illustrating processes of performing lossless compression and storing reference data according to an exemplary embodiment of the present invention.

FIG. 5 is a block diagram illustrating methods of performing lossless compression and storing reference data according to an exemplary embodiment of the present invention. A system 500 in which a lossless compression controller 520, a lossless compression reconstruction unit 530, a cache storage unit 540 and a cache controller 550 operate together to transmit reference data in consideration of a data bus bandwidth and the efficiency of a burst cycle, will be described in greater detail with reference to FIG. 5.

The lossless compression controller 520 defines the relation between deblocked data and losslessly compressed data of the deblocked data. The losslessly compressed data is not divided into data sections at a fixed rate and thus a starting index and the length of each of the data sections are needed to exactly detect the location of data. Thus the lossless compression controller 520 may provide the cache controller 550 with compression information regarding the starting index and the length of each of the data sections of the losslessly compressed data.

The cache controller 550 may determine reference data that is to be stored in the cache storage unit 540 and detect data corresponding to the reference data from the losslessly compressed data. The compression information received from the lossless compression controller 520 may be used for the cache controller 550 to detect the data corresponding to the reference data from the losslessly compressed data.

The cache controller 550 controls the losslessly compressed data detected based on the compression information to be transmitted to the lossless compression reconstruction unit 530. Reconstructed reference data may be stored as mass data or update data in the cache storage unit 540.

The cache storage unit 540 may consist of 3n 128-bit (16-pixel) caches or 6m 64-bit (8-pixel) caches (n and m are positive integers), so that a block of 21 pixels may be included in one line of the cache storage unit 540 at once since a reference block 548 has a maximum width of 21 pixels for motion compensation.

The cache storage unit 540 may be divided into a mass data region 542 and an update data region 544. The height of the mass data region 542 may correspond to a vertical search range of the reference block 548.

The cache controller 550 allows reference data, which is stored in a second part of the cache storage unit 540 to perform motion compensation in a next cycle, to be moved to and stored in a first part of the cache storage unit 540, in synchronization with a point of time when processing of reference data that is stored in the first part of the cache storage unit 540 to perform motion compensation in a current cycle is completed.

At the same time, the cache controller 550 controls reference data, which is used to perform motion compensation in a cycle immediately after the next cycle, to be received from the lossless compression reconstruction unit 530 and to be updated in the second part.

A unit of losslessly compressed deblocked data corresponding to a block of the deblocked data may irregularly change due to lossless compression. An index-related problem caused due to lossless compression may be fixed using compression information regarding a starting index and the length of each section of the losslessly compressed data. Thus it is possible to detect losslessly compressed data corresponding to predetermined reference data.

Since losslessly compressed data is transmitted via a data bus, the usage efficiency of the overall data bus bandwidth of the image encoding apparatus 300 of FIG. 3A or the image decoding apparatus 301 of FIG. 3B is improved.

Figure 6:
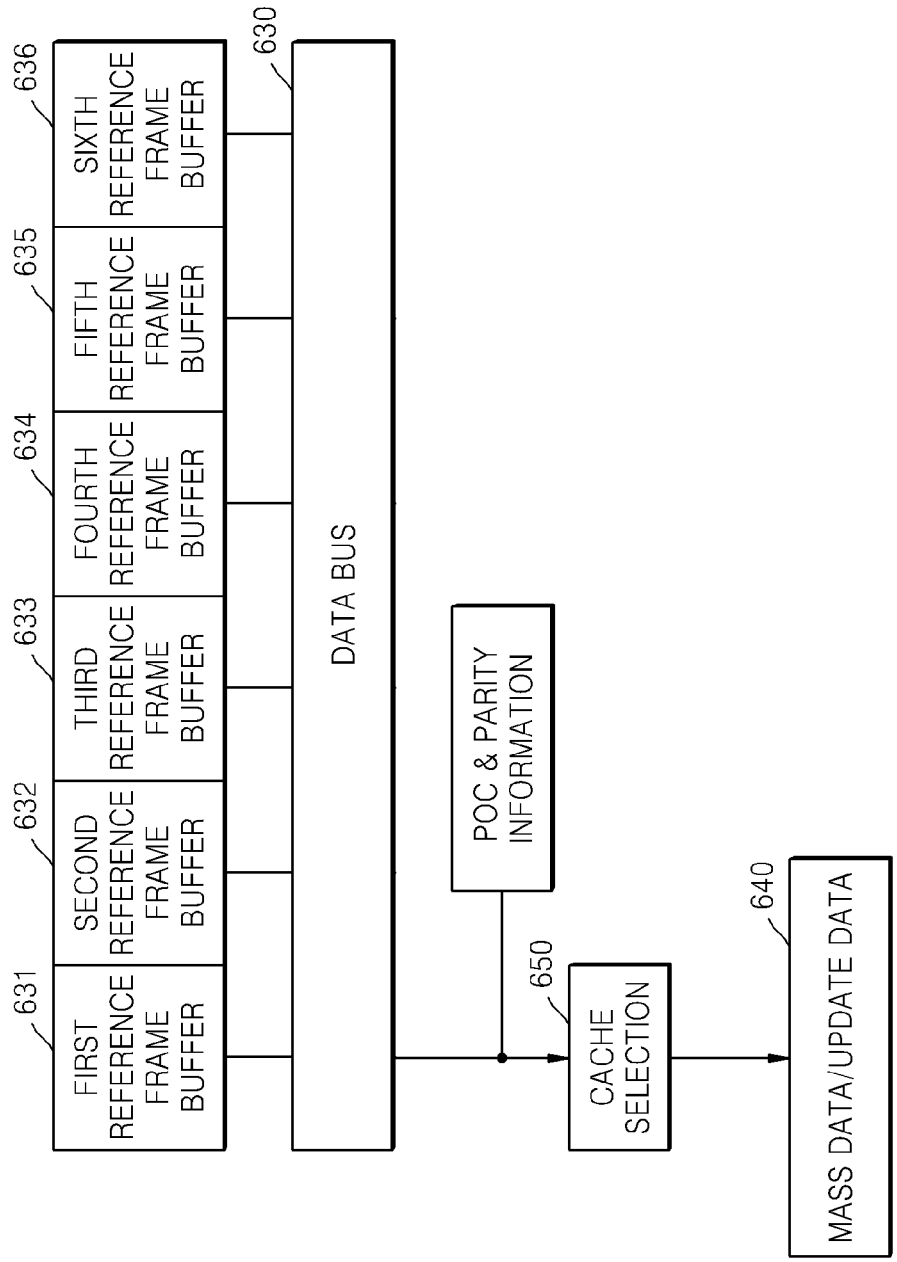
FIG. 6 is a block diagram illustrating a method of selecting reference data according to an exemplary embodiment of the present invention.

FIG. 6 is a block diagram illustrating a method of selecting reference data according to an exemplary embodiment of the present invention. In a cache selecting operation 650, POC information or parity information of reference data is used to search for mass data/update data 640 that is to be stored in a cache or the like. That is, reference information, which is searched for by using POC information or parity information of first through sixth reference frames stored in an external memory or being respectively stored in first through sixth reference frame buffers 631, 632, 633, 634, 635, and 636 of the reference storage unit 330 of FIG. 3A, may be transmitted to and stored in the cache via the a data bus 630.

In the image encoding apparatus 300 or the image decoding apparatus 301 according to the current exemplary embodiment, losslessly compressed deblocked data is stored as reference data in the first through sixth reference frame buffers 631 through 636. Thus compression information regarding the relation between deblocked data and the losslessly compressed deblocked data is needed. The compression information includes information regarding a starting index and the length of the losslessly compressed deblocked data.

Figure 7:
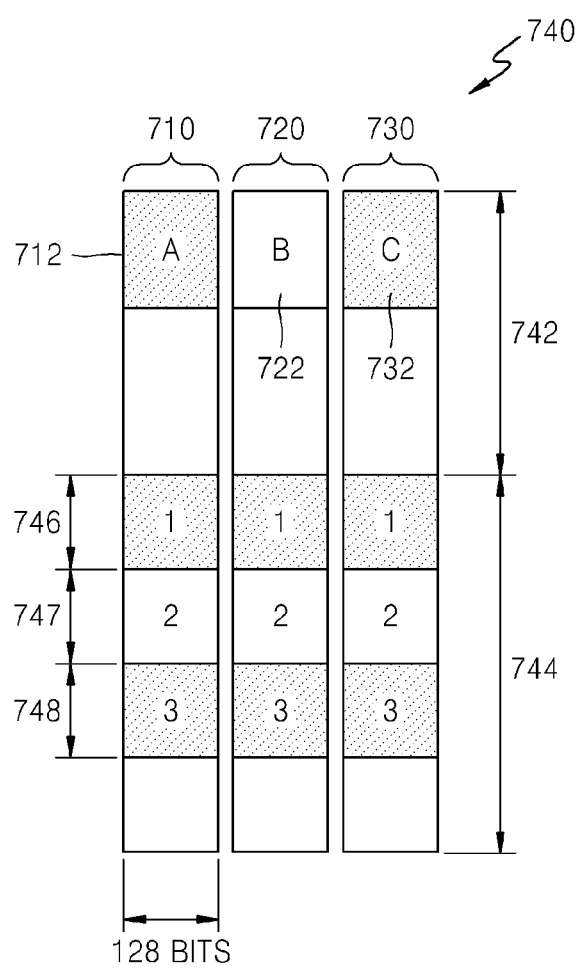
FIG. 7 illustrates the structure of a cache storage unit according to an exemplary embodiment of the present invention.

FIG. 7 illustrates the structure of a cache storage unit 740 according to an exemplary embodiment of the present invention. The cache storage unit 740 may be divided into first through third caches 710, 720, and 730. It is assumed that 16×16 pixel blocks A, B, and C are respectively stored in mass data regions 742 of the respective first through third caches 710 through 730, and motion compensation is sequentially performed on the blocks A, B, and C.

The efficiency of transmission of data via a data bus may be maximized when predetermined or more bursts of data are transmitted per clock signal. Thus if two bursts (128 bytes, 16 pixels) of data are stored in a line of an update data region 744 of each of the first through third caches 710, 720, and 730 for each of clock signals in consideration of burst characteristics, a total of six bursts (two bursts×3) may be continuously stored in the cache storage unit 740 for each of the clock signals.

Also, a motion compensation cycle and a data update cycle may be synchronized with each other in order that reference data may be output from the mass data region 742 and be then stored in the update data region 744 in the motion compensation cycle.

For example, if six bursts of data are stored in a line of the update data region 744 of each of the first through third caches 710 through 730 for each clock signal, six bursts of data may be updated in five lines 746, five lines 747, and six lines 748, i.e., a total of sixteen lines, of the update data region 744 while motion compensation is performed using mass data blocks A 712, B 722, and C 732.

That is, while three-cycle motion compensation is performed on the mass data blocks A 712, B 722, and C 732 which are 16×16 blocks, the motion compensation cycle and the data update cycle may be synchronized with each other so that 54×5 (746), 54×5 (747), and 54×6 (748) pixel data are respectively updated in the update data regions 744 of the respective first through third caches 710 through 730.

The cache controllers 150, 350, 455 and 550 according to the above exemplary embodiments are capable of controlling a storing cycle, amount, and location of reference data that is to be stored in the corresponding cache storage units 140, 340, 540 and 440, as described above with reference to FIG. 7.

Figure 8:
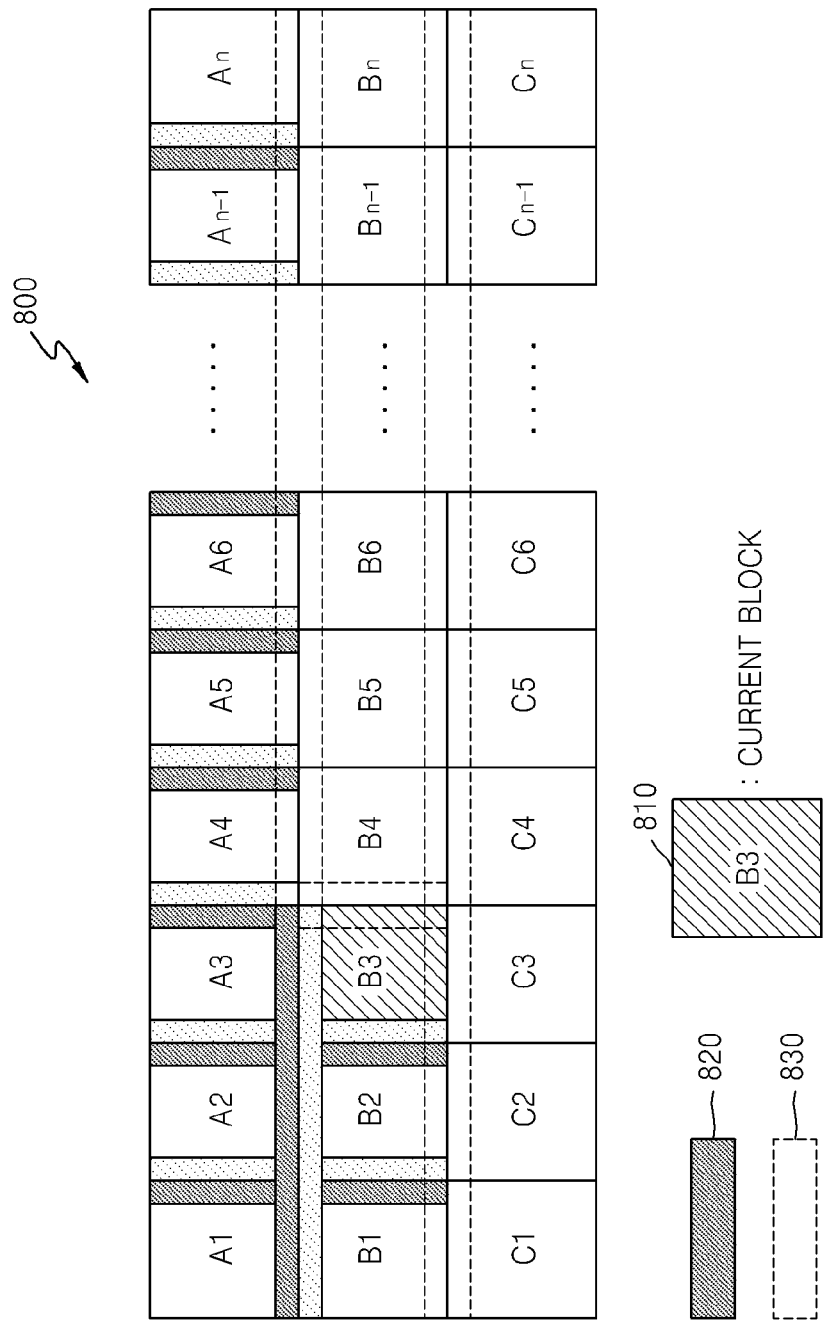
FIG. 8 illustrates a window for lossless compression according to an exemplary embodiment of the present invention.

FIG. 8 illustrates a window for lossless compression according to an exemplary embodiment of the present invention. For efficient lossless compression, the image encoding apparatus 300 of FIG. 3A and the image decoding apparatus 301 of FIG. 3B according to an exemplary embodiment of the present invention may perform variable window-based lossless compression.

When deblocking is performed on blocks A1, A2, through to An, B1, B2, B3 of image data 800, the window may include these blocks on which deblocking has been completed.

Border regions between blocks are to be deblocked. Thus, when the block B3 is a current block 810, shaded border regions 820 denote regions that are deblocked and dotted border regions 830 denote regions that are to be deblocked.

The border regions between peripheral blocks may be changed when a predetermined block is deblocked. Thus even if the blocks A4, A5, through to An, B1, B2, B3 are deblocked, dotted border regions thereof may later be changed and the blocks A4, A5, through to An, B1, B2, B3 are therefore considered as not completing deblocking.

Accordingly, a window determined according to whether deblocking is completed may be determined to include the blocks A1, A2, through to An, B1, B2, B3 except for the dotted border regions thereof.

The window is determined based on the size of reference data that can be stored in the cache storage unit 140 (or 340 or 540), and thus the bandwidth of a data bus or burst cycle efficiency may be improved. For example, the range of the window may be determined to fall within the sum of a vertical search range of mass data region and the height range (sixteen pixels) of an update data region.

Also, a window for lossless compression may vary depending on whether the lossless compression is to be performed on current reference data or next reference data. For example, a window for performing lossless compression on mass data may be determined to have a relatively large size, and a window for performing lossless compression on update data may be determined to have a size equal to that of reference data that is to be updated.

Such variable characteristics of the window for lossless compression may influence compression information regarding losslessly compressed deblocked data, which is provided from the lossless compression controller 520. The compression information specifying a starting index and the length of each section of the losslessly compressed deblocked data may be determined to be proportional to the total number of losslessly compressed deblocked blocks.

Since data is losslessly compressed based on a variable-sized window for lossless compression, which is determined by the lossless compression controller 520, it is possible to reduce the size of a space for storing the compression information regarding the starting indexes and lengths of the compressed blocks.

The lossless compression controllers 120, 320, and 520 according to the above exemplary embodiments are capable of variably determining lossless compressed regions of deblocked data as described above with reference to FIG. 8.

Figure 9:
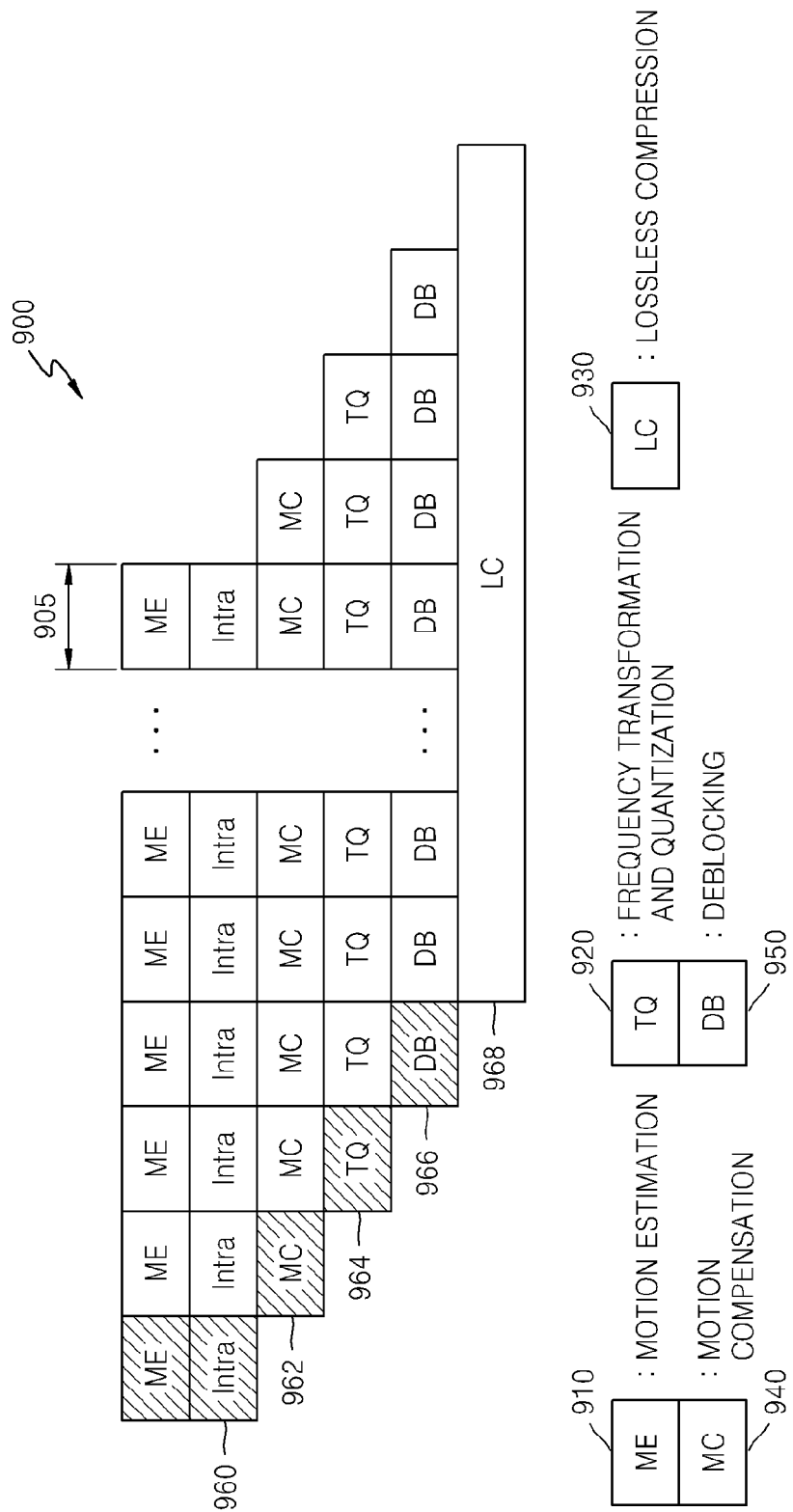
FIG. 9 illustrates a pipelined structure of an image encoding/decoding apparatus according to an exemplary embodiment of the present invention.

FIG. 9 illustrates a pipelined structure 900 of the image encoding apparatus 300 of FIG. 3A or the image decoding apparatus 301 of FIG. 3B according to an exemplary embodiment of the present invention. In the pipelined structure 900 of an image encoding/decoding system, first through fifth regions 910 through 950 respectively denote a motion estimation region, a frequency transformation and quantization region, a lossless compression region, a motion compensation region, and a deblocking region.

The width 905 of one region of the pipelined structure 900 denotes a processing cycle of one data block. For example, in the processing cycle, when motion estimation and intra prediction 960 is performed on a first block in a first cycle, motion compensation 962 is performed on the first block in a second cycle, frequency transformation/quantization 964 is performed on the first block in a third cycle, deblocking 966 is performed on the first block in a fourth cycle, and then lossless compression 968 is performed on the first block in a fifth cycle.

In synchronization with the processing cycle of the first block, motion estimation and intra prediction may be performed on a second block in a second cycle, motion compensation may be performed on the second block in a third cycle, frequency transformation/quantization may be performed on the second block in a fourth cycle, deblocking may be performed on the second block in a fifth cycle, and lossless compression may be performed on the second block in a sixth cycle.

In a lossless compression region 968 according to an exemplary embodiment of the present invention, a window for lossless compression is determined to be variable and may thus have at least one block. Thus a processing cycle of the lossless compression region 968 is not limited to the width 905 of one region and may be determined to be variable based on the size of the window for lossless compression.

Figure 10:
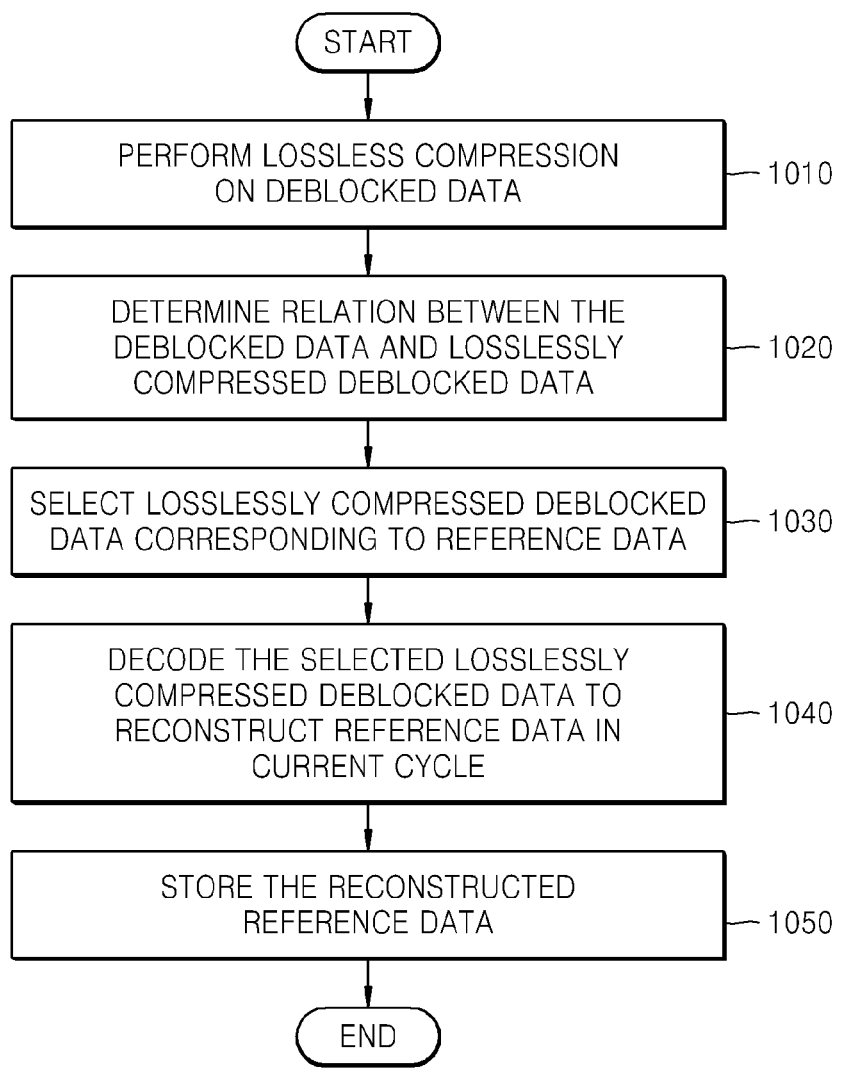
FIG. 10 is a flowchart illustrating a method of providing reference data for encoding or decoding an image according to an exemplary embodiment of the present invention.

FIG. 10 is a flowchart illustrating a method of providing reference data for encoding or decoding an image according to an exemplary embodiment of the present invention. In operation 1010, deblocked data is losslessly compressed on a window basis. A window for lossless compression may be determined in consideration of the bandwidth of a data bus and burst cycle efficiency. Also, a region that is not influenced by deblocking of neighboring blocks may be included in the window for lossless compression. The losslessly compressed deblocked data is transmitted to and stored in an external memory via a data bus.

In operation 1020, the relation between the deblocked data and the losslessly compressed deblocked data and the size of a window for lossless compression are determined. Compression information regarding a starting index and length of each of sections of the losslessly compressed deblocked data may be determined based on the relation between the deblocked data and the losslessly compressed deblocked data.

In operation 1030, losslessly compressed deblocked data corresponding to reference data used to perform motion compensation on predetermined data, is selected from the losslessly compressed deblocked data in consideration of the burst characteristics of the data bus.

Losslessly compressed deblocked data corresponding to deblocked data that is to be used as reference data, is searched for by using the compression information regarding the relation between the deblocked data and the losslessly compressed deblocked data. The reference data that is to be used in a predetermined motion compensation cycle may be transmitted in units of data, which are determined in consideration of the bandwidth of the data bus and burst cycle efficiency, so as to be immediately transmitted for motion compensation.

In operation 1040, losslessly compressed deblocked data corresponding to the reference data is decoded to reconstruct the reference data. The losslessly compressed deblocked data is received from the external memory via the data bus and then is decoded. Only the losslessly compressed deblocked data corresponding to the reference data transmitted in the determined units of data may be decoded to reconstruct the reference data.

In operation 1050, the reconstructed reference data is stored in a cache. The reference data is stored in the cache before it is used for motion compensation or estimation. A storing cycle of and amount of the reference data that is to be stored may be determined according to the speed of data transmission, which is set to maximize the burst characteristics of the data bus. Also, the location of the cache for storing the reference data and the storing cycle of and amount of the reference data that is to be stored may be determined in consideration of a motion compensation/estimation cycle.

Motion compensation or estimation may be performed using the reference data stored in the cache. Since the losslessly compressed deblocked data is transmitted via the data bus after performing deblocking, a bandwidth for transmitting the reference data is not only reduced but also the occupancy rate of the bandwidth of the data bus is reduced since cache reference data is used during motion compensation/estimation. Since reference data is read from a cache memory, the amount of processing time may also be reduced. Accordingly, the efficiency of the data bus is improved during encoding/decoding of an image, and therefore, the processing efficiency of image encoding/decoding may be improved.

The above exemplary embodiments of the present invention may be embodied as a computer program. The computer program may be stored in a computer readable recording medium, and executed using a general digital computer. Examples of the computer readable recording medium include a magnetic recording medium (a ROM, a floppy disk, a hard disc, etc.), or an optical recording medium (a CD-ROM, a DVD, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding apparatus comprising:
   a lossless compression unit that performs lossless compression on deblocked data on a window basis during encoding of image data;
   a lossless compression controller that determines a relation between the deblocked data and losslessly compressed deblocked data and a size of the window;
   a cache controller that selects losslessly compressed deblocked data corresponding to reference data used for motion compensation or motion estimation from the losslessly compressed deblocked data, based on the determined relation between the deblocked data and the losslessly compressed deblocked data;
   a lossless compression reconstruction unit that decodes the selected losslessly compressed deblocked data to reconstruct the reference data; and
   a cache storage unit that stores the reconstructed reference data.

2. An image decoding apparatus comprising:
   a lossless compression unit that performs lossless compression on deblocked data on a window basis during decoding of encoded image data;
   a lossless compression controller that determines a relation between the deblocked data and losslessly compressed deblocked data and a size of the window;
   a cache controller that selects losslessly compressed deblocked data corresponding to reference data used for motion compensation or motion estimation from the losslessly compressed deblocked data, based on the determined relation between the deblocked data and the losslessly compressed deblocked data;
   a lossless compression reconstruction unit that decodes the selected losslessly compressed deblocked data to reconstruct the reference data; and
   a cache storage unit that stores the reconstructed reference data.

3. The apparatus of claim 2, further comprising a reference storage unit that stores the losslessly compressed deblocked data,
   wherein the losslessly compressed deblocked data is input to the reference storage unit or is output from the reference storage unit via a data bus.

4. The apparatus of claim 2, wherein the lossless compression controller determines a data region that is to be losslessly compressed based on whether deblocking filtering is completed.

5. The apparatus of claim 2, wherein for processing data on a block-by-block basis, the cache controller determines a number and range of blocks corresponding to the reference data stored in the cache storage unit; and
   wherein the cache controller detects losslessly compressed deblocked data corresponding to the number and range of reference data blocks, and controls the lossless compression reconstruction unit to reconstruct the losslessly compressed deblocked data.

6. The apparatus of claim 3, wherein the cache controller determines reference data that is to be reconstructed and stored in the cache storage unit in consideration of an available bandwidth and burst characteristics of the data bus.

7. The apparatus of claim 6, wherein the cache controller selects reference data by searching for reference data based on picture order count information and parity information of the reference data.

8. The apparatus of claim 3, wherein the lossless compression controller determines the size of the window in consideration of an available bandwidth and burst characteristics of the data bus.

9. The apparatus of claim 3, wherein the cache controller determines a cycle and location in which the reconstructed reference data is stored in the cache storage unit, in consideration of an available bandwidth and burst characteristics of the data bus.

10. The apparatus of claim 3, wherein the cache controller determines a storing speed and locations of reference data for performing motion compensation and estimation in a current cycle and reference data for performing motion compensation and estimation in a next cycle, which are stored in the cache storage unit to be synchronized with cycles of motion compensation and estimation.

11. The apparatus of claim 3, further comprising:
a motion compensation unit performing motion compensation by using the reconstructed reference data; and
a motion estimation unit performing motion estimation by using the reconstructed reference data.

12. The apparatus of claim 3, wherein the lossless compression controller stores compression information regarding a starting index and a length of each of sections of the losslessly compressed deblocked data, based on the relation between the deblocked data and losslessly compressed deblocked data.

13. The apparatus of claim 3, wherein the cache storage unit comprises:
a first part in which data falls within a vertical search range for searching for reference data; and
a second part which is the remaining part of the cache storage unit excluding the first part.

14. The apparatus of claim 13, wherein the cache controller controls reference data in a current cycle to be stored in the first part of the cache storage unit, and controls reference data in a next cycle to be periodically updated in the second part of the cache storage unit in consideration of bandwidth and burst characteristics of the data bus.

15. The apparatus of claim 14, wherein the cache controller controls at least four bursts of data to be stored so that one line of the second part of the cache storage unit may be accessed per clock cycle.

16. The apparatus of claim 8, wherein, when the apparatus has a pipelined structure in which each of motion estimation, motion compensation, frequency transformation and quantization, and deblocking is sequentially performed on one block in one operating cycle during the decoding of the image data, the lossless compression unit performs lossless compression in an operating cycle corresponding to the window whose size is determined based on the bandwidth and burst cycle of the data bus.

17. The apparatus of claim 12, wherein a total number of sections of the losslessly compressed deblocked data is proportional to sizes and a total number of windows for lossless compression.

18. The apparatus of claim 2, further comprising:
an entropy decoding unit that performs entropy decoding on the encoded image data;
an inverse quantization unit that inversely quantizes the entropy-decoded data;
an inverse frequency transformation unit that performs inverse frequency transformation on the inversely quantized data; and
a deblocking filter that performs deblocking filtering on the inversely frequency-transformed data.

19. An image encoding method comprising:
performing lossless compression on deblocked data on a window basis during encoding of image data;
determining a relation between the deblocked data and losslessly compressed deblocked data and a size of the window;
selecting losslessly compressed deblocked data corresponding to reference data used to perform motion compensation or motion estimation from the losslessly compressed deblocked data, based on the determined relation between the deblocked data and the losslessly compressed deblocked data;
decoding the selected losslessly compressed deblocked data to reconstruct the reference data; and
storing the reconstructed reference data in a cache buffer.

20. An image decoding method comprising:
performing lossless compression on deblocked data on a window basis during decoding of encoded image data;
determining a relation between the deblocked data and losslessly compressed deblocked data and a size of the window;
selecting losslessly compressed deblocked data corresponding to reference data used to perform motion compensation or motion estimation from the losslessly compressed deblocked data, based on the determined relation between the deblocked data and the losslessly compressed deblocked data;
decoding the selected losslessly compressed deblocked data to reconstruct the reference data; and
storing the reconstructed reference data in a cache buffer.

21. The method of claim 20, wherein the losslessly compressed deblocked data is input to or output from a reference memory via a data bus.

22. The method of claim 21, further comprising determining reference data that is to be reconstructed and stored in the cache buffer in consideration of an available bandwidth and burst characteristics of the data bus.

23. The method of claim 21, further comprising determining the size of the window in consideration of an available bandwidth and burst characteristics of the data bus, and
wherein the performing of lossless compression comprises performing lossless compression on the deblocked data in the window whose size is determined.

24. The method of claim 21, wherein a cycle and location in which the reconstructed reference data is stored in the cache buffer are determined in consideration of an available bandwidth and burst characteristics of the data bus.

25. The method of claim 21, further comprising:
performing motion compensation by using the reconstructed reference data; and
performing intra prediction by using the reconstructed reference data.

26. The method of claim 21, wherein the determining of the relation between the deblocked data and losslessly compressed deblocked data comprises determining compression information regarding a starting index and a length of each of sections of the losslessly compressed deblocked data, based on the relation between the deblocked data and losslessly compressed deblocked data.

27. The method of claim 21, wherein the cache buffer comprises:
a first part in which data falls within a vertical search range for searching for reference data; and
a second part which is the remaining part of the cache storage unit excluding the first part.

28. The method of claim 21, wherein the storing of the reconstructed reference data in the cache buffer comprises:
   storing reference data in a current cycle in the first part of the cache storage unit; and
   periodically updating and storing reference data in a next cycle in the second part of the cache storage unit in consideration of bandwidth and burst characteristics of the data bus.

29. The method of claim 23, wherein, when the method uses a pipelined structure in which each of motion estimation, motion compensation, frequency transformation and quantization, and deblocking is sequentially performed on one block in one operating cycle during decoding of the image data, lossless compression is performed in an operating cycle corresponding to the window whose size is determined based on the bandwidth and burst cycle of the data bus.

30. The method of claim 20, further comprising:
   entropy decoding the encoded image data;
   inversely quantizing the entropy-decoded data;
   performing inverse frequency transformation on the inversely quantized data; and
   performing deblocking filtering on the inversely frequency-transformed data.

31. A non-transitory computer readable recording medium having recorded thereon a computer program for executing an image encoding method comprising:
   performing lossless compression on deblocked data on a window basis during encoding of image data;
   determining a relation between the deblocked data and losslessly compressed deblocked data and a size of the window;
   selecting losslessly compressed deblocked data corresponding to reference data used to perform motion compensation or motion estimation from the losslessly compressed deblocked data, based on the determined relation between the deblocked data and the losslessly compressed deblocked data;
   decoding the selected losslessly compressed deblocked data to reconstruct the reference data; and
   storing the reconstructed reference data in a cache buffer.

32. A non-transitory computer readable recording medium having recorded thereon a computer program for executing an image decoding method comprising:
   performing lossless compression on deblocked data on a window basis during decoding of encoded image data;
   determining a relation between the deblocked data and losslessly compressed deblocked data and a size of the window;
   selecting losslessly compressed deblocked data corresponding to reference data used to perform motion compensation or motion estimation from the losslessly compressed deblocked data, based on the determined relation between the deblocked data and the losslessly compressed deblocked data;
   decoding the selected losslessly compressed deblocked data to reconstruct the reference data; and
   storing the reconstructed reference data in a cache buffer.

* * * * *